(12) United States Patent
Iwato et al.

(10) Patent No.: US 7,800,727 B2
(45) Date of Patent: Sep. 21, 2010

(54) LIQUID CRYSTAL DISPLAY DEVICE HAVING BUS LINE WITH OPENING PORTIONS OVERLAPPED BY CONDUCTIVE FILMS

(75) Inventors: Hiroaki Iwato, Mobara (JP); Katsumi Ichihara, Chiba (JP)

(73) Assignee: Hitachi Displays, Ltd., Chiba-Ken (JP)

( * ) Notice: Subject to any disclaimer, the term of this patent is extended or adjusted under 35 U.S.C. 154(b) by 203 days.

(21) Appl. No.: 11/752,323

(22) Filed: May 23, 2007

(65) Prior Publication Data
US 2007/0279563 A1 Dec. 6, 2007

(30) Foreign Application Priority Data
May 31, 2006 (JP) .............................. 2006-151681

(51) Int. Cl.
G02F 1/1343 (2006.01)
G02F 1/1333 (2006.01)
G02F 1/1345 (2006.01)
(52) U.S. Cl. .......................... 349/139; 349/54; 349/149
(58) Field of Classification Search .............. 349/39, 349/139, 147, 149–152, 54, 55
See application file for complete search history.

(56) References Cited

U.S. PATENT DOCUMENTS
2003/0164919 A1* 9/2003 Oh et al. .................... 349/149

2006/0012729 A1* 1/2006 Tanaka et al. ................. 349/54
2006/0092352 A1* 5/2006 Lin ............................. 349/110

FOREIGN PATENT DOCUMENTS
JP 2003-156763 5/2003

* cited by examiner

Primary Examiner—Andrew Schechter
Assistant Examiner—Michael Inadomi
(74) Attorney, Agent, or Firm—Antonelli, Terry, Stout & Kraus, LLP.

(57) ABSTRACT

In a substrate of a liquid crystal display device which forms a bus line which three-dimensionally intersects scanning signal lines, video signal lines and an insulation layer thereon, the present invention facilitates repairs of short-circuiting between the respective signal lines and the bus line. A liquid crystal display device includes a liquid crystal panel which is constituted of a pair of substrates with liquid crystal sandwiched therebetween. Out of the pair of substrates, one substrate includes a bus line which is arranged outside a display region and is electrically connected to a first conductive layer arranged inside the display region, and a plurality of signal lines which three-dimensionally intersect the bus line by way of an insulation layer. The bus line includes opening portions outside intersecting regions where the bus line is overlapped to the signal lines as viewed in a plan view. The opening portions are arranged on both sides of each intersecting region.

9 Claims, 8 Drawing Sheets

LIQUID CRYSTAL DISPLAY DEVICE HAVING BUS LINE WITH OPENING PORTIONS OVERLAPPED BY CONDUCTIVE FILMS

The present application claims priority from Japanese application JP2006-151681 filed on May 31, 2006, the content of which is hereby incorporated by reference into this application.

BACKGROUND OF THE INVENTION

1. Field of the invention

The present invention relates to a liquid crystal display device, and more particularly to a technique which is effectively applicable to a liquid crystal display device which arranges a bus line outside a display region.

2. Description of Related Art

Conventionally, a liquid crystal display device has been popularly used as a display for a television receiver set or a personal computer (PC), a display of a mobile phone terminal or a personal digital assistant (PDA) or the like.

The liquid crystal display device is a display device which includes a liquid crystal display panel sealing a liquid crystal material between a pair of substrates. Here, one substrate out of the pair of substrates includes, for example, a plurality of scanning signal lines, video signal lines which three-dimensionally intersect the plurality of scanning signal lines by way of an insulation layer, and a TFT element and a pixel electrode which are arranged in each pixel region surrounded by two neighboring scanning signal lines and two neighboring video signal lines. The substrate which includes the TFT elements and the pixel electrodes is generally referred to as a TFT substrate.

Further, a conductive layer which is referred to as a bus line may be arranged on the TFT substrate outside a display region which is constituted of a plurality of pixel regions, for example (see patent document 1, for example).

When the liquid crystal display panel adopts a lateral electric field driving method such as an IPS (In-Plane Switching) method, for example, counter electrodes (also referred to as common electrodes) may be also formed on the TFT substrate. Here, the TFT substrate includes the bus line which is electrically connected with the counter electrodes outside the display region.

Further, when the liquid crystal display panel adopts a vertical electric field drive method such as a TN method or a VA method, holding capacitance lines for forming holding capacitances (also referred to as storage capacitances) may be formed on the TFT substrate. Here, the TFT substrate includes the bus line which is electrically connected with the holding capacitance lines outside the display region.

[Patent document 1] JP-A-2003-156763

SUMMARY OF THE INVENTION

When the bus line is arranged outside the display region of the TFT substrate, the bus line is generally provided in an annular shape to surround the display region. Accordingly, the scanning signal lines and the video signal lines three-dimensionally intersect the bus line outside the display region.

Here, at an intersecting region where each signal line and the bus line intersect each other, for example, an insulation layer such as a silicon nitride (SiN) film and a semiconductor layer which is simultaneously formed with a channel layer of the TFT element are interposed thus preventing short-circuiting between each signal line and the bus line.

However, there may be a case in which a defect occurs in a step for forming the insulation layer or the semiconductor layer and, for example, the video signal line and the bus line are short-circuited with each other due to the defect.

In forming the bus line in the conventional TFT substrate, a width of the bus line is extremely large compared to widths of the scanning signal lines and the video signal lines. Accordingly, for example, when the video signal line and the bus line are short-circuited with each other, there has been a drawback that a repair of the short-circuiting is extremely difficult. Further, because of the difficulty in repairing, there also exists a drawback that a manufacturing yield rate of the TFT substrate is lowered.

Accordingly, it is an object of the present invention to provide a technique which, in a substrate on which a bus line which three-dimensionally intersects scanning signal lines and video signal lines by way of an insulation layer is formed, can easily repair short-circuiting when the short-circuiting is generated between each signal line and the bus line.

It is another object of the present invention to provide a technique for enhancing a manufacturing yield rate of a substrate on which a bus line which three-dimensionally intersects scanning signal lines and video signal lines by way of an insulation layer is formed outside a display region.

The above-mentioned and other objects and novel features of the present invention will become apparent from the description of this specification and attached drawings.

To schematically explain the summary of typical inventions among inventions disclosed in this specification, they are as follows.

The present invention is characterized in that, in a liquid crystal display device comprising a liquid crystal panel which is constituted of a pair of substrates with liquid crystal sandwiched therebetween, one substrate out of the pair of substrates includes a bus line which is arranged outside a display region and is electrically connected to a first conductive layer arranged inside the display region, and a plurality of signal lines which three-dimensionally intersect the bus line by way of an insulation layer, the bus line includes opening portions outside intersecting regions where the bus line is overlapped to the signal lines as viewed in a plan view, and the opening portions are arranged on both sides of each intersecting region.

In the liquid crystal display device of the present invention, even when a width (a distance between both edges) of the bus line is large, a portion of the bus line where the opening portion is formed has a width thereof narrowed by an amount corresponding to a width of the opening portion. Accordingly, for example, when a video signal line and the bus line are short-circuited with each other, the bus line can be easily cut at both sides of the intersecting region of the video signal line thus facilitating the repair of the short-circuiting.

Here, with respect to the opening portion formed in the bus line, by arranging two or more opening portions in parallel in a region sandwiched by two neighboring intersecting regions in the extending direction of the signal lines in the intersecting region, the bus line can be easily cut while maintaining electrical properties of the bus line.

Here, in arranging two or more opening portions in the region of the bus line sandwiched between two neighboring intersecting regions in the extending direction of the signal lines, the opening portions which extend from the vicinity of one intersecting region to the vicinity of another intersecting region may be arranged in parallel or a plurality of opening portions may be arranged in the vicinity of one intersecting region and another plurality of opening portions may be arranged in the vicinity of another intersecting region.

Further, the substrate which includes the bus line may include a second conductive layer which is formed on a region which is overlapped to the bus line in a plan view by way of an insulation layer, and the bus line and the second conductive layer may be electrically connected with each other via a through hole.

Further, the present invention is applicable to an IPS-method liquid crystal display panel, for example. Here, the substrate which includes the bus line includes a plurality of scanning signal lines, video signal lines which three-dimensionally intersect the plurality of scanning signal lines by way of an insulation layer, a TFT element and a pixel element which are arranged in each region which is surrounded by two neighboring scanning signal lines and two neighboring video signal lines, and counter electrodes, wherein the first conductive layer constitutes the counter electrodes.

DESCRIPTION OF THE PREFERRED EMBODIMENT

Hereinafter, the present invention is explained in detail in conjunction with an embodiment by reference to the drawings. Here, in all drawings for explaining the embodiment, parts having identical functions are given same symbols and their repeated explanation is omitted.

Embodiment

Figure 1:
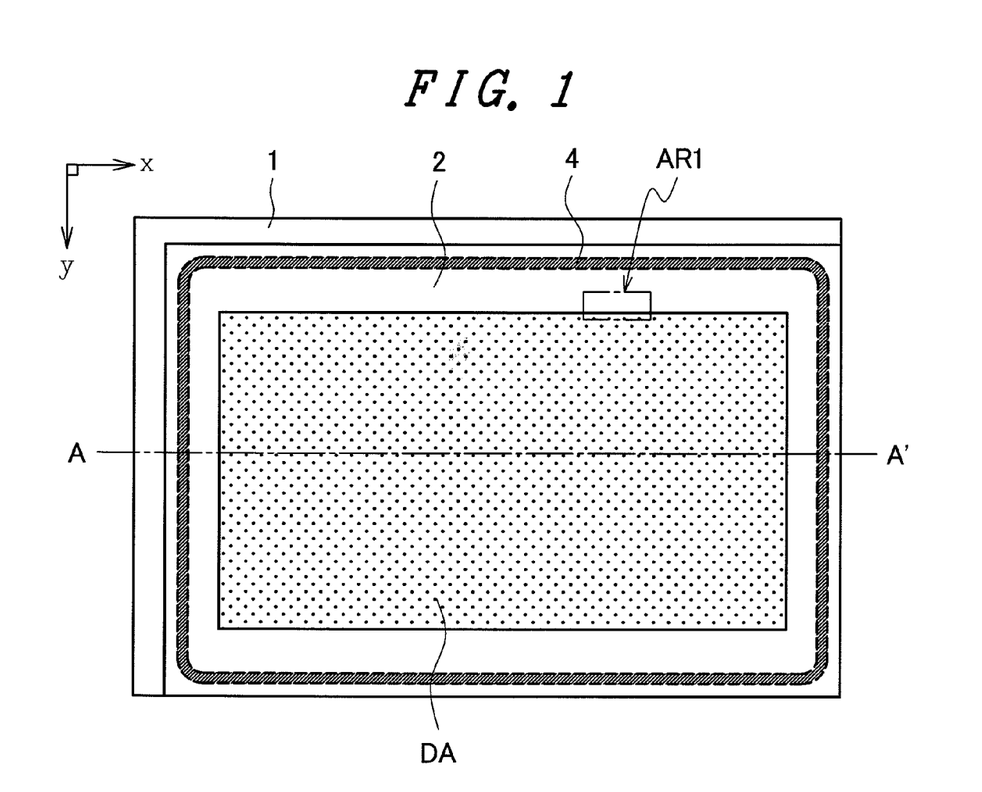
FIG. 1 is a schematic plan view of a liquid crystal display panel as viewed from a viewer side.
Figure 2:
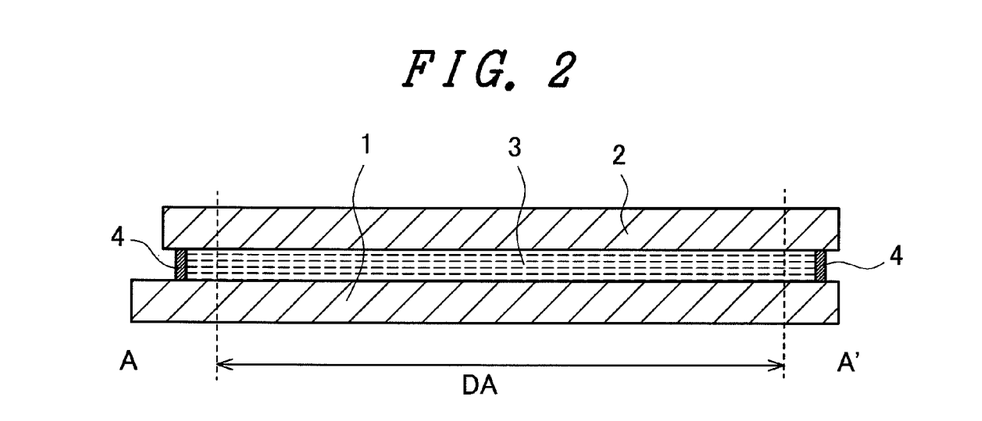
FIG. 2 is a schematic cross-sectional view taken along a line A-A' in FIG. 1.

FIG. 1 and FIG. 2 are schematic views showing the schematic constitution of a liquid crystal display panel of one embodiment according to the present invention.

FIG. 1 is a schematic plan view of the liquid crystal display panel as viewed from a viewer side. FIG. 2 is a schematic cross-sectional view taken along a line A-A' in FIG. 1.

The present invention relates to a display device provided with a display panel having a substrate which forms a bus line outside a display region and on which a plurality of signal lines three-dimensionally intersect the bus line by way of an insulation layer. As one example of such a display panel, a liquid crystal display panel is named. In this embodiment, a lateral electric field drive liquid crystal display panel such as an IPS (In-Plane Switching) liquid crystal display panel is exemplified and the constitution, the manner of operation and advantageous effects of the liquid crystal panel to which the present invention is applied are explained.

The liquid crystal display panel is, for example, as shown in FIG. 1 and FIG. 2, a display panel which seals a liquid crystal material 3 between a pair of substrates 1, 2. Here, the pair of substrates 1, 2 is adhered to each other with a sealing material 4 which is annularly arranged outside a display region DA. The liquid crystal material 3 is sealed in a space surrounded by the pair of substrates 1, 2 and the sealing material 4.

Out of the pair of substrates 1, 2, the substrate 1 having a larger profile size as viewed form a viewer is generally referred to as a TFT substrate. Although not shown in FIG. 1 and FIG. 2, the TFT substrate 1 is configured such that on a surface of a transparent substrate such as a glass substrate, the plurality of scanning signal lines, and the plurality of video signal lines which three-dimensionally intersect the plurality of scanning signal lines by way of an insulation layer are formed. A region which is surrounded by two neighboring scanning signal lines and two neighboring video signal lines corresponds to one pixel region, and a TFT element, a pixel electrode and the like are arranged for each pixel region. Further, another substrate 2 which makes the pair with the TFT substrate 1 is generally referred to as a counter substrate.

Further, when the liquid crystal display panel adopts a lateral-electric-field driving method such as an IPS method, counter electrodes (also referred to as common electrodes) which face the pixel electrodes on the TFT substrate 1 are formed on the TFT substrate 1. Here, the counter electrodes are, for example, connected to a common bus line (not shown in the drawing) which is annularly arranged outside a display region DA.

Figure 3:
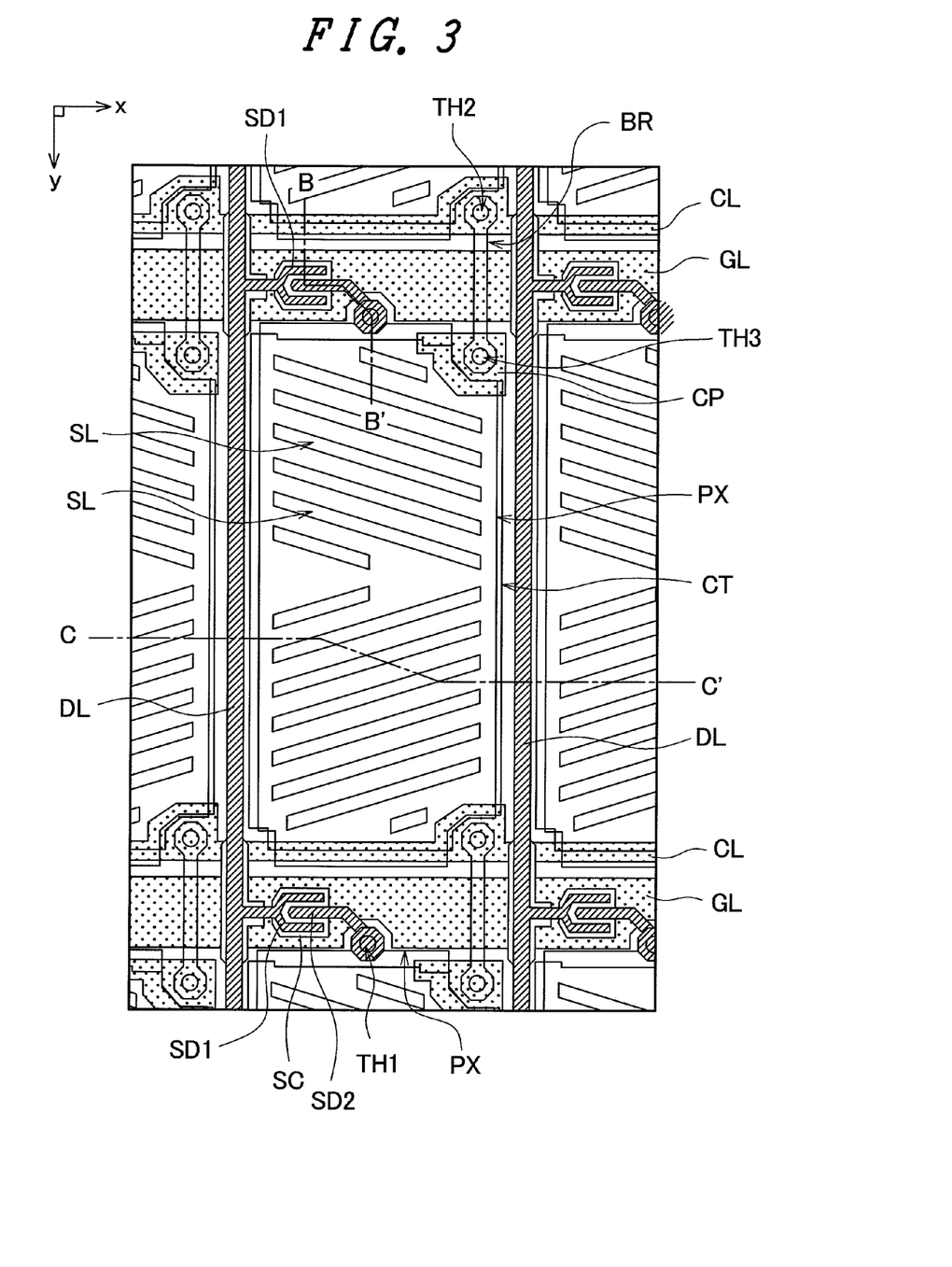
FIG. 3 is a schematic plan view showing a constitutional example of one pixel on a TFT substrate of the liquid crystal display panel of this embodiment.
Figure 4:
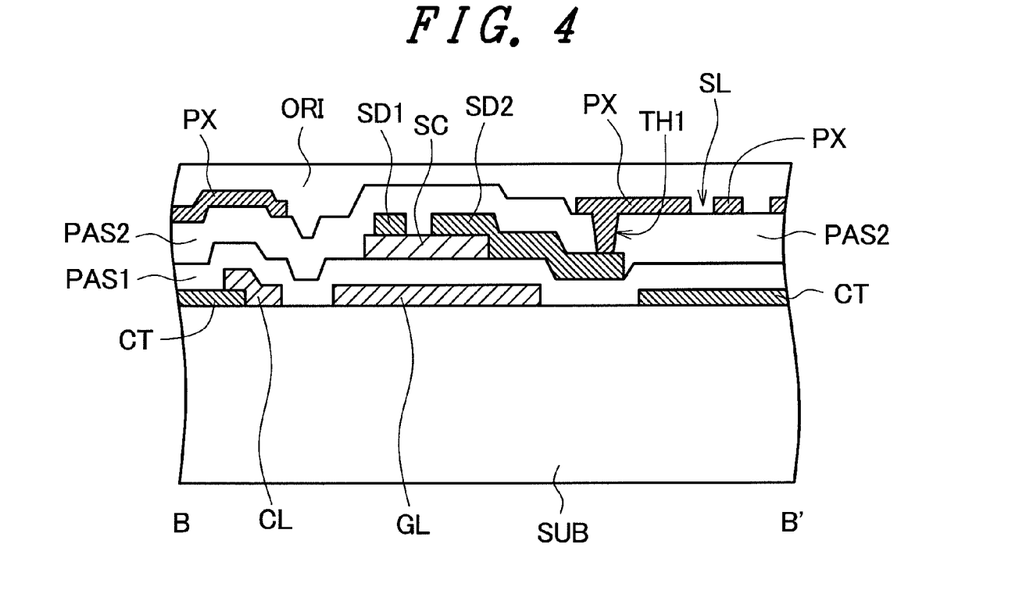
FIG. 4 is a schematic cross-sectional view taken along a line B-B' in FIG. 3.
Figure 5:
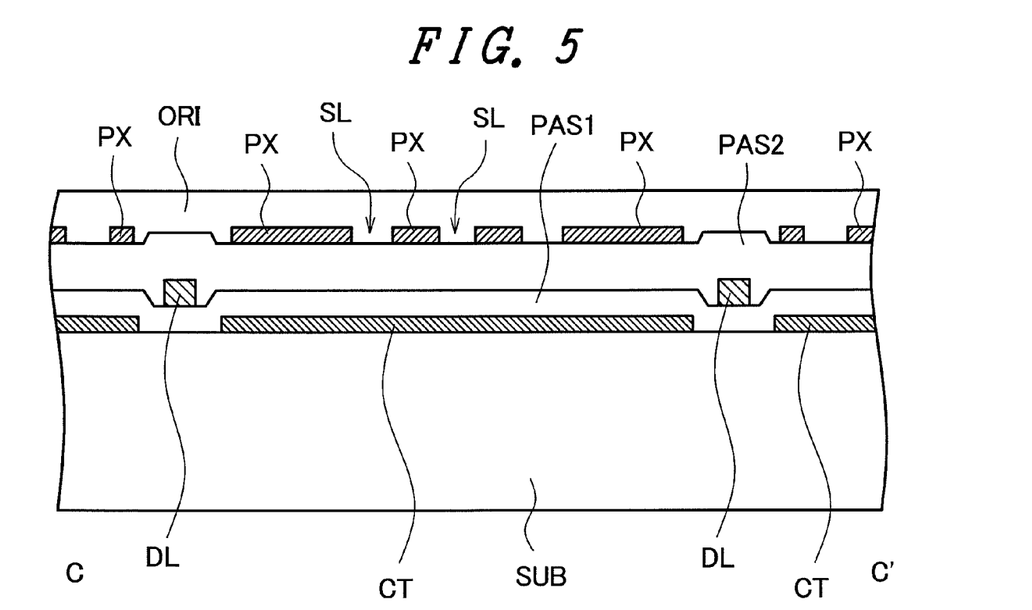
FIG. 5 is a schematic cross-sectional view taken along a line C-C' in FIG. 3.

Next, a constitutional example of one pixel of the display region DA of the liquid crystal display panel adopting the lateral-electric-field driving method is briefly explained in conjunction with FIG. 3 to FIG. 5.

FIG. 3 is a schematic plan view showing a constitutional example of one pixel on a TFT substrate of the liquid crystal display panel of this embodiment. FIG. 4 is a schematic cross-sectional view taken along a line B-B' in FIG. 3. FIG. 5 is a schematic cross-sectional view taken along a line C-C' in FIG. 3.

In the liquid crystal display panel adopting the lateral-electric-field driving method, the pixel electrode and the counter electrodes (common electrodes) are formed on the TFT substrate 1 side. Here, the TFT substrate 1 is, for example, as shown in FIG. 3 to FIG. 5, configured such that on a surface of the glass substrate SUB, the plurality of scanning signal lines GL which extend in the x direction are formed, and over the scanning signal lines GL, the plurality of video signal lines DL which extend in the y direction and three-dimensionally intersect the plurality of scanning signal lines GL by way of a first insulation layer PAS1 are formed. Further, the region which is surrounded by two neighboring scanning signal lines GL and two neighboring video signal lines DL corresponds to one pixel region.

Further, on the surface of the glass substrate SUB, for example, a planar counter electrode CT is formed for every pixel region. Here, the counter electrodes CT of the respective pixel regions arranged in the extending direction (x direction) of the scanning signal lines GL are electrically connected with a common signal line CL arranged parallel to the scanning signal line GL. Here, the respective common signal lines CL are electrically connected with the common bus line outside the display region DA. Further, as viewed from the scanning signal line GL, on a side opposite to the direction along which the common signal line CL is arranged, a common connection pad CP which is electrically connected with the counter electrode CT is provided.

Further, over the first insulation layer PAS1, besides the video signal lines DL, semiconductor layers, drain electrodes SD1 and source electrode SD2 are formed. Here, the semiconductor layers are formed using amorphous silicon (a-Si), for example. The semiconductor layers are constituted of not only semiconductor layers having a function of channel layers SC of TFT elements which are arranged for respective pixel regions and semiconductor layers which prevent short-circuiting between the scanning signal lines GL and the video signal lines DL at regions where the scanning signal lines GL and the video signal lines DL three-dimensionally intersect with each other (not shown in the drawing). Here, to the semiconductor layer which has the function of the channel layer SC of the TFT elements, both of the drain electrode SD1 and the source electrode SD2 which are connected to the video signal line DL are connected.

Further, on a surface (layer) on which the video signal lines DL and the like are formed, the pixel electrodes PX are formed by way of a second insulation layer PAS2. The pixel electrodes PX are electrodes which are arranged independently for respective pixel regions, wherein the pixel electrode PX is electrically connected with the source electrode SD2 at an opening portion (through hole) TH1 which is formed in the second insulation layer PAS. Further, when the counter electrode CT and the pixel electrode PX are, as shown in FIG. 3 to FIG. 5, arranged in a stacked manner by way of the first insulation layer PAS1 and the second insulation layer PAS2, the pixel electrode PX is formed of a comb-teeth-shaped electrode in which slits SL are formed.

Further, over the second insulation layer PAS2, besides the pixel electrodes PX, for example, bridge lines BR each of which electrically connecting two counter electrodes CT arranged vertically with the scanning signal line GL sandwiched therebetween are formed. Here, the bridge line BR is connected with the common signal line CL and common connection pad CP which are arranged with the scanning signal line GL sandwiched therebetween via through holes TH2, TH3.

Further, over the second insulation layer PAS2, an orientation film ORI is formed to cover the pixel electrodes PX and the bridge lines BR. Here, although not shown in the drawing, the counter substrate 2 is arranged to face the surface of the TFT substrate 1 on which the orientation film ORI is formed.

Hereinafter, the constitution, the manner of operation and advantageous effects of the liquid crystal display device when the present invention is applied to the liquid crystal panel (TFT substrate) in which one pixel has the constitution shown in FIG. 3 to FIG. 5 are explained.

Figure 6:
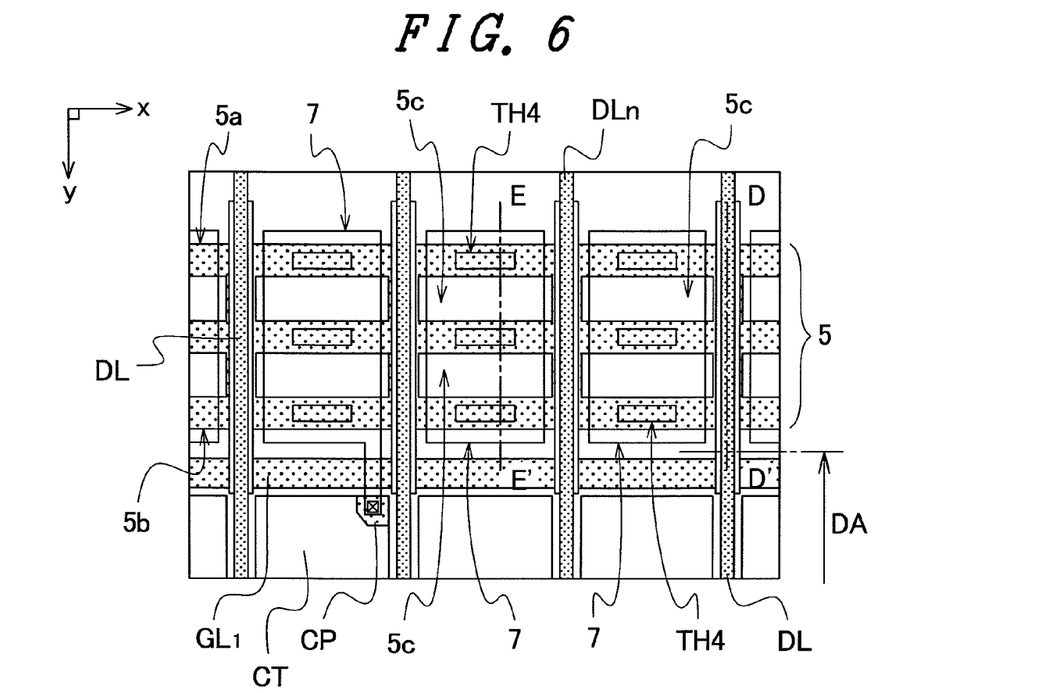
FIG. 6 is a schematic plan view showing one constitutional example of the TFT substrate in a region AR1 in FIG. 1.
Figure 7:
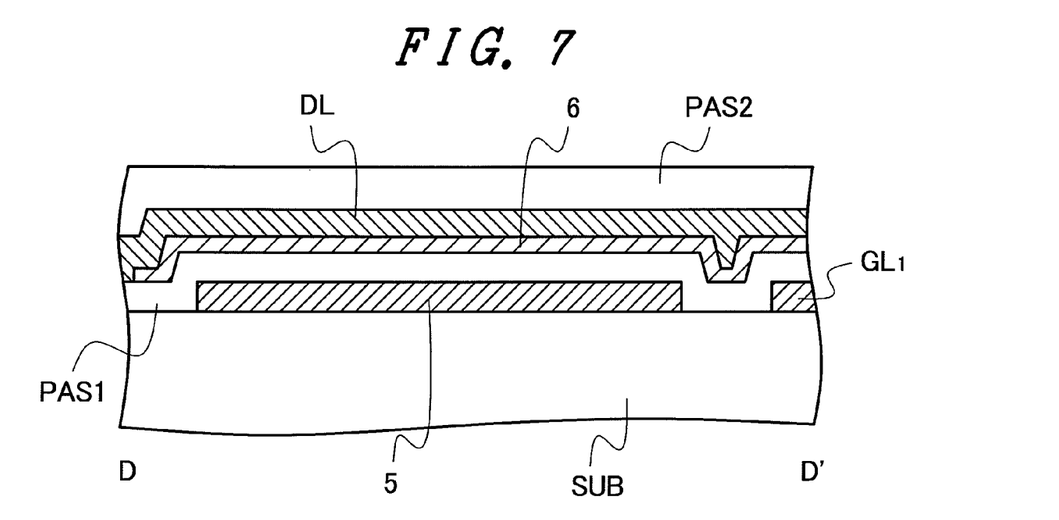
FIG. 7 is a schematic cross-sectional view taken along a line D-D' in FIG. 6.
Figure 8:
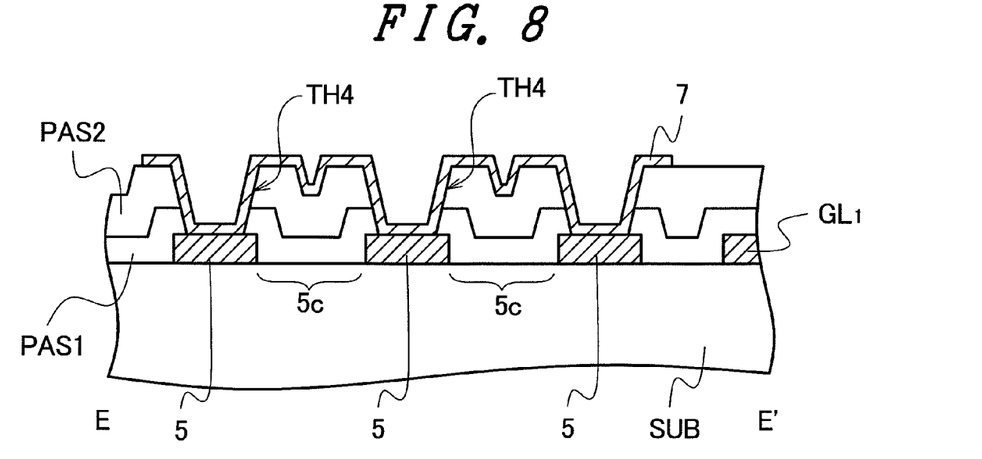
FIG. 8 is a schematic cross-sectional view taken along a line E-E' in FIG. 6.

FIG. 6 is a schematic plan view showing one constitutional example of the TFT substrate in a region AR1 in FIG. 1. FIG. 7 is a schematic cross-sectional view taken along a line D-D' in FIG. 6. FIG. 8 is a schematic cross-sectional view taken along a line E-E' in FIG. 6.

In the liquid crystal display panel of this embodiment, the TFT substrate 1 of the region AR1 shown in FIG. 1 is, for example, configured as shown in FIG. 6 to FIG. 8. In FIG. 6 which is a plan view, a scanning signal line $GL_1$ is a signal line which is arranged on an outermost side out of the plurality of scanning lines, and corresponds to an outer periphery of the display region DA. Further, a common bus line 5 which is connected with the counter electrode CT by way of the common signal lines CL or the like is arranged outside the scanning signal lines $GL_1$ as viewed from the display region DA.

Here, the common bus line 5 is, for example, simultaneously formed with the scanning signal lines GL. Accordingly, for example, as shown in FIG. 6 and FIG. 7, the common bus line 5 three-dimensionally intersects the plurality of video signal lines DL. Here, in each intersecting region where the common bus line 5 and the video signal lines DL three-dimensionally intersect each other, the first insulation layer PAS1 and the semiconductor layer 6 are interposed. Further, in the intersecting region of the common bus line 5 and the video signal lines DL, the common bus line 5 extends to another end 5b thereof from one end 5a thereof without disconnection.

Further, for example, as shown in FIG. 6 and FIG. 8, the common bus line 5 forms opening portions 5c outside the intersecting regions with the video signal lines DL. The opening portions 5c are, for example, as shown in FIG. 6, configured such that two opening portions 5c are arranged in the extending direction of the video signal lines DL for every region of the common bus line 5 which is sandwiched between two neighboring intersecting regions.

Here, in the region of the common bus line 5 which is sandwiched between two neighboring intersecting regions, for example, a conductive layer 7 is formed by way of the first insulation layer PAS1 and the second insulation layer PAS2. Further, the conductive layer 7 is connected with the common bus line via through holes TH4 which are formed in the first insulation layer PAS1 and the second insulation layer PAS2. Further, some of the conductive layers 7 stride over the scanning signal line $GL_1$ and are electrically connected with the counter electrodes CT by way of common connection pads CP which are arranged in the pixel regions. The conductive layers 7 are, for example, simultaneously formed with the pixel electrodes PX.

Here, FIG. 6 is an enlarged view of a position of the AR1 (a long side of the display region DA) in FIG. 1 and hence, the conductive layers 7 are directly connected with the counter electrode CT. However, in a short side of the display region DA, as described above, the conductive layers 7 are connected with the common signal lines CL.

Figure 9:
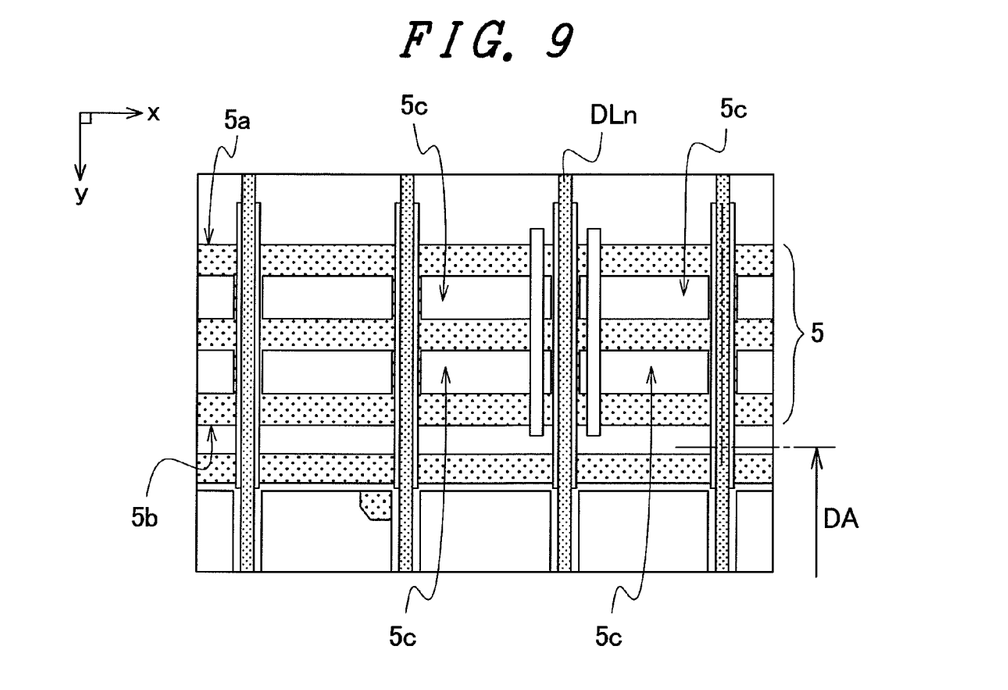
FIG. 9 is a schematic plan view for explaining the manner of operation and advantageous effects of the TFT substrate of this embodiment.

FIG. 9 is a schematic plan view for explaining the manner of operation and advantageous effects of the TFT substrate of this embodiment.

As in the case of the TFT substrate of this embodiment, when the common bus line 5 is arranged outside the display region DA and the common bus line 5 and the video signal lines DL three-dimensionally intersect each other, in the intersecting region of the common bus line 5 and the video signal line DL, as shown in FIG. 6 to FIG. 8, the first insulation layer PAS1 and the semiconductor layer 6 are interposed. Further, in the region where the common bus line 5 and the video signal line DL intersect each other, the common bus line 5 extends to another end 5b thereof from one end 5a thereof without disconnection, and the video signal line DL intersects the common bus line 5 in an approximately flat surface. Accordingly, usually, there is no possibility that the video signal lien DL is brought into contact with and short-circuited with the common bus line 5.

However, in steps for forming the first insulation layer PAS1 or the semiconductor layer 6, attributed to the an irregular film thickness in film forming or an etching defect in patterning or the like, there exists a possibility that the video signal line DL is brought into contact with and is short-circuited with the common bus line 5. Since a conventional common bus line which has no opening portions 5c has a large width and hence, for example, it is difficult to separate a short-circuited portion by cutting the common bus line.

To the contrary, in the TFT substrate of this embodiment, the common bus line 5 is, for example, separated in three in the extending direction of a video signal line $DL_n$ by the opening portions 5c on both sides of the video signal line $DL_n$ shown in FIG. 6, and a width of each separated common bus line is, for example, substantially equal to a width of the scanning signal line $GL_1$. Accordingly, for example, when the video signal line $DL_n$ is short-circuited with the common bus line 5, as shown in FIG. 9, by cutting portions of the common bus line which are arranged on both sides of the video signal line $DL_n$ and have the width thereof narrowed by being separated by the opening portions 5c, it is possible to easily separate the short-circuited portion of the common bus line 5. In cutting the short-circuited common bus line 5, for example, laser beams may be radiated to the common bus line 5.

Here, the common bus line 5 is annularly formed so as to surround the display region DA and hence, in FIG. 9, the common bus line 5 which is arranged on a right side of the video signal line $DL_n$ and the common bus line 5 which is arranged on a left side of the video signal line $DL_n$ are electrically connected with each other.

As described above, according to the TFT substrate 1 of this embodiment, when the common bus line 5 which is formed outside the display region DA and the video signal line DL are short-circuited with each other, it is possible to easily separate only the portion where the common bus line 5 is short-circuited with the video signal line DL. Accordingly, the short-circuiting between the common bus line 5 and the video signal line DL can be easily repaired. Further, as a result, a manufacturing yield rate of the TFT substrate 1 (liquid crystal display panel) can be enhanced.

Figure 10:
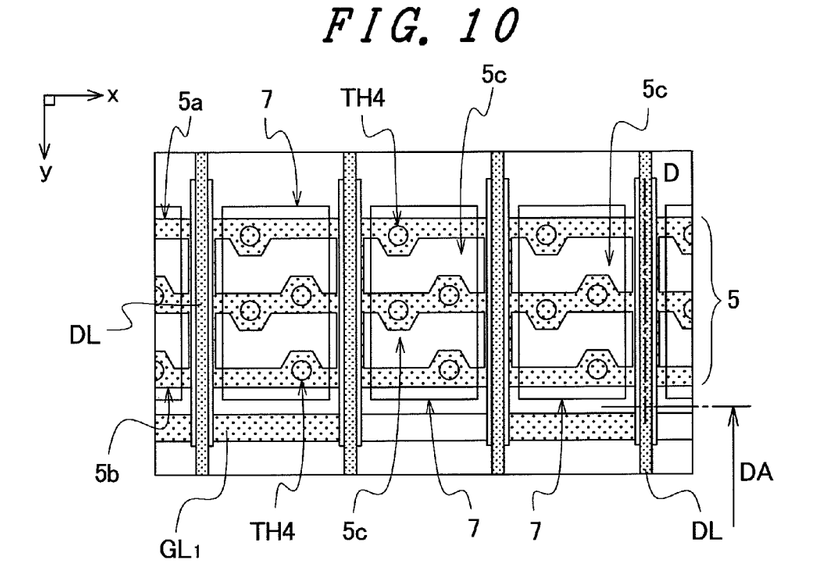
FIG. 10 is a schematic plan view for explaining a first modification of this embodiment.
Figure 11:
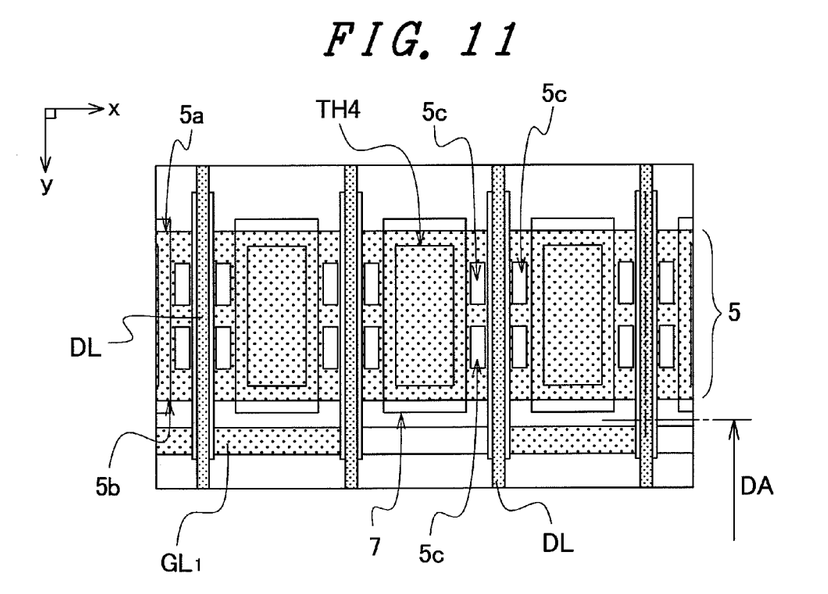
FIG. 11 is a schematic plan view for explaining a second modification of this embodiment.

FIG. 10 is a schematic plan view for explaining a first modification of this embodiment. FIG. 11 is a schematic plan view for explaining a second modification of this embodiment. Here, FIG. 10 and FIG. 11 are plan views showing only a periphery of the common bus line 5 in the region AR1 in FIG. 1 by picking up such a periphery.

In this embodiment, opening portions 5c are formed in the common bus line 5 outside an intersecting region of the common bus line 5 and the video signal line DL where the common bus line 5 three-dimensionally intersects the video signal line DL thus enabling the easy separation of a portion of the common bus line 5 which is short-circuited with the video signal lines DL. Here, it is needless to say that a planar shape of an opening end of the opening portion 5c which is formed in the common bus line 5 is not limited to a rectangular shape shown in FIG. 6, and various kinds of shapes are applicable to the common bus line 5. That is, for example, as shown in FIG. 10, the planar shape of the opening end of the opening portion 5c may be formed such that the separated common bus line increases a width thereof only in a region where the through hole TH4 for connecting the conductive layer 7 and the common bus line 5 is formed and a periphery of the region. In this case, outside the region where the through hole TH4 is formed, a width of each separated common bus line which is formed by the opening portions 5c can be narrowed and hence, it is possible to easily cut the short-circuited portion of the common bus line within a short time.

Further, in the example shown in FIG. 6 and FIG. 10, between two neighboring video signal lines DL, two opening portions 5c which extend from the vicinity of one video signal line to the vicinity of another video signal line are arranged in the extending direction of the video signal lines. However, it is needless to say that the arrangement of the opening portions 5c of the common bus line 5 is not limited to the above-mentioned arrangement. For example, as shown in FIG. 11, two opening portions 5c may be arranged in the vicinity of one video signal line and another two opening portions 5c may be arranged in the vicinity of another video signal line. Due to such a constitution, it is possible to expand a contact area between the conductive layer 7 and the common bus line 5 which are connected with each other via the through holes TH4.

Here, in this embodiment, the region where the common bus line 5 and the video signal lines DL three-dimensionally intersect each other is exemplified. It is needless to say, however, that the present invention is not limited to the above-mentioned constitution and the same goes for regions where the common bus line 5 and the scanning signal lines GL three-dimensionally interest each other. In the regions where the common bus line 5 and the scanning signal lines GL three-dimensionally intersect each other, the common bus line 5 is formed simultaneously with the video signal lines DL and the like, and the plurality of scanning signal lines GL three-dimensionally intersect the common bus line 5 by way of the first insulation layer PAS1 and the semiconductor layer 6. Accordingly, also with respect to the regions where the common bus line 5 and the scanning signal lines GL three-dimensionally intersect each other, provided that the opening portions 5c as shown in FIG. 6, FIG. 10 and FIG. 11 are formed in the common bus line 5, when the scanning signal line GL and the common bus line 5 are short-circuited with each other, it is possible to easily separate only a short-circuited portion of the common bus line 5.

Figure 12:
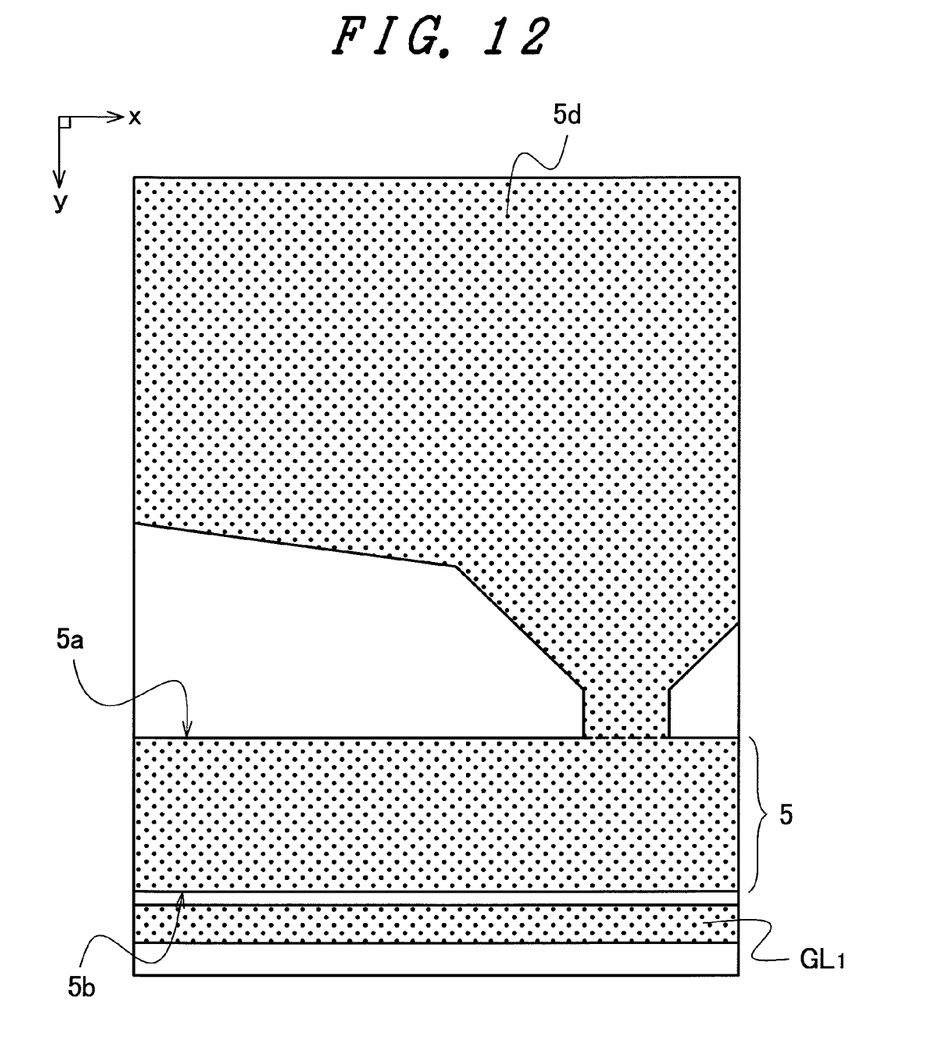
FIG. 12 is a schematic plan view for explaining a shape of a conventional common bus line.
Figure 13:
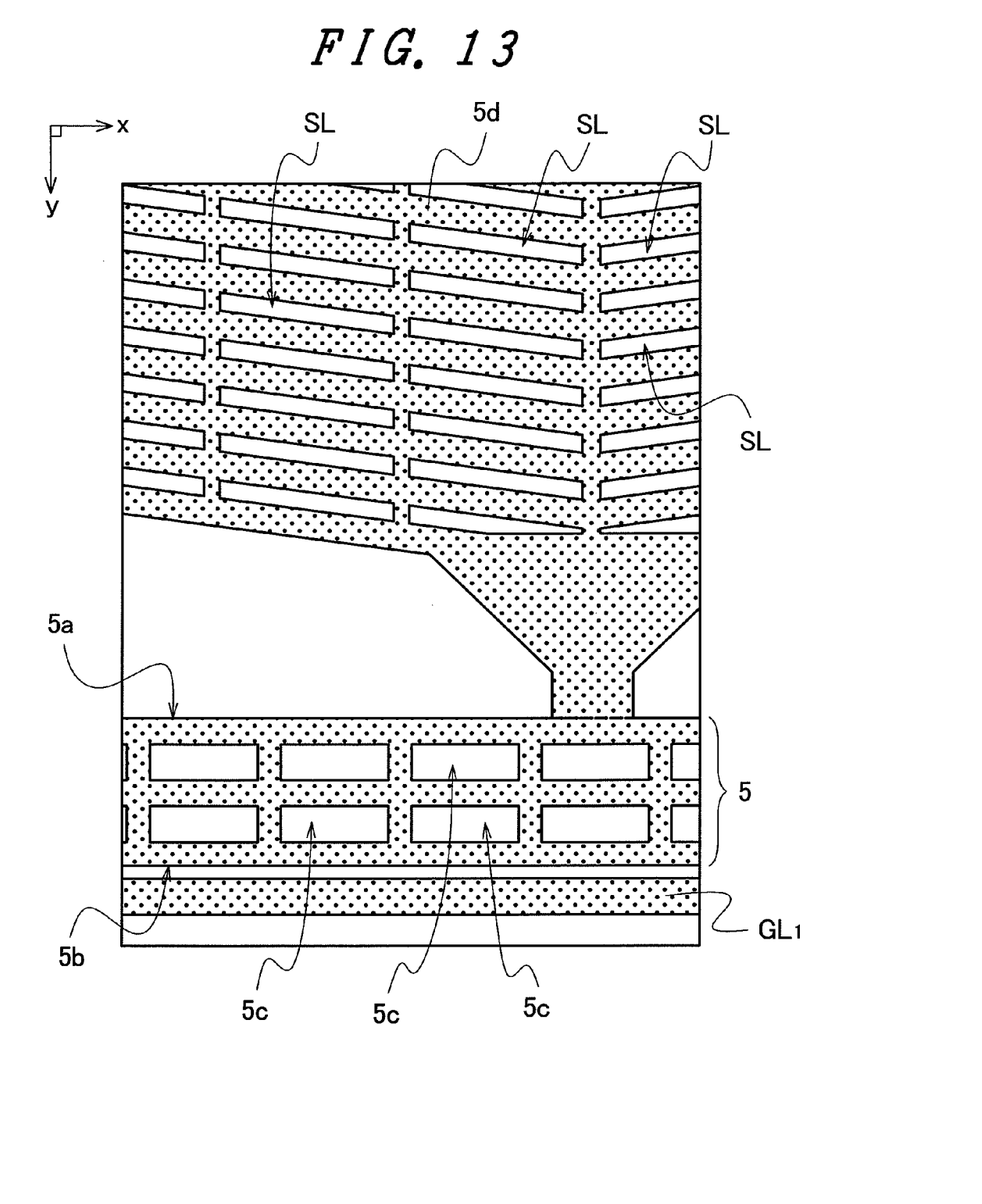
FIG. 13 is a schematic plan view for explaining the more desirable constitution of a common bus line on the TFT substrate of this embodiment.

FIG. 12 and FIG. 13 are schematic views for explaining another manner of operation and advantageous effects of the TFT substrate of this embodiment.

FIG. 12 is a schematic plan view for explaining a shape of a conventional common bus line. FIG. 13 is a schematic plan view for explaining the more desirable constitution of a common bus line on the TFT substrate of this embodiment.

In the conventional TFT substrate, when the common bus line is arranged outside the display region, for example, as shown in FIG. 12, the common bus line 5 is arranged in the vicinity of the scanning signal line $GL_1$ which is arranged on an outermost side. Here, when the plurality of scanning signal lines GL and the common bus line 5 are simultaneously formed by etching a conductive film formed on a substrate, for example, an etching resist (mask) is formed on a region where the scanning signal lines GL are formed and a region where the common bus line 5 is formed respectively.

However, as shown in FIG. 12, when the common bus line 5 having an extremely large area compared to the scanning signal line $GL_1$ is formed in the vicinity of the scanning signal line $GL_1$, it is difficult to form a resist pattern for a region which is left as the scanning signal line $GL_1$ thus narrowing a width of the scanning signal line $GL_1$.

On the other hand, with respect to the TFT substrate of this embodiment, for example, as shown in FIG. 6, FIG. 10 and FIG. 11, the opening portions are formed in the common bus line 5 and hence, an area of the resist pattern of a region which is left as the common bus line 5 becomes small compared to the conventional common bus line. That is, with the provision of the TFT substrate of this embodiment, it is also possible to expect an advantageous effect that a resist pattern of a region which is left as the scanning signal line $GL_1$ can be formed easily and it is possible to prevent a width of the scanning signal line $GL_1$ from being narrowed.

Further, out of the common bus line 5 which is arranged outside the display region DA, to the common bus line which is formed in the vicinity of an end portion of the video signal line DL to which a video signal is inputted, as shown in FIG. 12, a matted pattern 5d for common inputting is applied. This matted pattern 5d extends to an end portion of the TFT substrate 1. When such a large matted pattern 5d is formed, it is difficult to further form a resist pattern of a region which is left as the scanning signal line GL and hence, a width of the scanning signal line $GL_1$ is further narrowed. Further, when the opening portion 5c is formed in the common bus line 5 as in the case of this embodiment, in the vicinity of the large matted pattern 5d, it is difficult to form the opening portion in the resist pattern thus giving rise to a possibility that a shape of an opening end of the opening portion 5c becomes irregular.

Accordingly, in the TFT substrate 1 of this embodiment, to further increase an advantageous effect to prevent the width of the scanning signal line GL from being narrowed, for example, it is desirable to form slits SL in the matted pattern 5d as shown in FIG. 13. Here, it is needless to say that a pattern of the slits SL formed in the matted pattern 5d is not limited to the pattern shown in FIG. 13 and various patterns are applicable.

Although the present invention has been specifically explained in conjunction with the embodiment heretofore, it is needless to say that the present invention is not limited to the above-mentioned embodiment and various modifications are conceivable without departing from the gist of the present invention.

For example, in the above-mentioned embodiment, the lateral electric field driving liquid crystal display panel (TFT substrate 1) in which one pixel has the constitution shown in FIG. 3 to FIG. 5 has been exemplified. However, it is needless to say that the present invention is not limited to the lateral electric field driving liquid crystal display panel and the present invention is applicable to a vertical electric field driving liquid crystal display panel such as a TN-method liquid crystal display panel or a VA-method liquid crystal display panel.

In the vertical electric field driving liquid crystal display panel, for example, the TFT substrate 1 may include holding capacitance lines which are arranged parallel to the scanning signal line GL. Here, the respective holding capacitance lines are connected with the common bus line outside the display region DA, for example. Accordingly, the common bus line three-dimensionally intersects the scanning signal lines and the video signal lines. Also in this case, by forming the opening portions 5c shown in FIG. 6, FIG. 10 or FIG. 11 in the common bus line, for example, it is possible to easily separate a portion of the common bus line which is short-circuited with the signal line.

Further, in the above-mentioned embodiment, the TFT substrate of the liquid crystal display panel has been exemplified. However, it is needless to say that the present invention is applicable to any display device provided that the display device includes a display panel having a substrate which forms a bus line outside a display region and allows a plurality of signal lines to three-dimensionally intersect the bus line by way of an insulation layer.

What is claimed is:

1. A liquid crystal display device comprising a liquid crystal panel which is constituted of a pair of substrates with liquid crystal sandwiched therebetween, wherein
   one of the pair of substrates includes a plurality of scanning signal lines, a plurality of video signal lines which three-dimensionally intersect the plurality of scanning signal lines via an insulation layer, a plurality of common signal lines which three-dimensionally intersect the scanning signal lines or the video signal lines via an insulation layer, and a bus line which is arranged outside a display region and supplies an electric signal to the common signal lines, wherein
   the scanning signal lines or the video signal lines form intersecting regions where the scanning signal lines or the video signal lines three-dimensionally intersect the bus line via the insulation layer and have an overlapping relation thereat,
   the bus line having a plurality of opening portions disposed entirely between and outside of respective intersecting regions as viewed in a plan view;
   a plurality of conductive films is formed between the respective intersecting regions and at a position where a respective conductive film is overlapped to the bus line and at least at one of the opening portions of the bus line via an insulation layer;
   the respective conductive film has electrically connected portions with the bus line by way of a plurality of through holes formed in the insulation film; and
   the bus line is formed in the same layer as the scanning signal line or the video signal line, and the respective conductive film is formed so as to be interposed between the bus line and the liquid crystal.

2. A liquid crystal display device according to claim 1, wherein the respective conductive film is connected with a respective common signal line.

3. A liquid crystal display device according to claim 1, wherein each of the opening portions is formed in a rectangular shape.

4. A liquid crystal display device according to claim 1, wherein a line width of a portion of the bus line at which at least one of the through holes of the insulation film is formed is wider than the line width of other portions of the bus line.

5. A liquid crystal display device according to claim 1, wherein each pixel region defined by two neighboring scanning signal lines and two neighboring video signal lines includes a TFT element, a pixel electrode and a counter electrode, the counter electrodes are formed on the same substrate as the scanning signal lines or the video signal lines, and
   the respective conductive film is connected to a respective counter electrode.

6. A liquid crystal display device according to claim 1, wherein each pixel region which is defined by two neighboring scanning signal lines and two neighboring video signal lines includes a TFT element and a pixel electrode, as well as a counter electrode, which is formed on a substrate different from the substrate on which the scanning signal lines or the video signal lines are formed, and holding capacitance lines are formed on the same substrate as the scanning signal lines or the video signal lines, and
   the respective conductive film is connected to a respective holding capacitance line.

7. A liquid crystal display device according to claim 5, wherein the respective conductive film is formed simultaneously with the pixel electrode.

8. A liquid crystal display device according to claim 6, wherein the respective conductive film is formed simultaneously with the pixel electrode.

9. A liquid crystal display device according to claim 1, wherein the plurality of opening portions of the bus line are disposed entirely between adjacent intersecting regions of the bus line with the scanning signal lines or the video signal lines, and the plurality of opening portions are disposed entirely outside of the intersecting regions of the bus line and the scanning signal lines or the video signal lines so as not to overlap the intersecting regions.

* * * * *